US011052822B2

(12) United States Patent
Takenaka et al.

(10) Patent No.: US 11,052,822 B2
(45) Date of Patent: Jul. 6, 2021

(54) VEHICLE CONTROL APPARATUS, CONTROL METHOD, AND STORAGE MEDIUM FOR STORING PROGRAM

(71) Applicant: HONDA MOTOR CO., LTD., Tokyo (JP)

(72) Inventors: Kenta Takenaka, Wako (JP); Yasuyuki Shigefuji, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/678,250

(22) Filed: Nov. 8, 2019

(65) Prior Publication Data
US 2020/0164801 A1 May 28, 2020

(30) Foreign Application Priority Data
Nov. 26, 2018 (JP) .............................. JP2018-220579

(51) Int. Cl.
G06T 7/00 (2017.01)
B60R 1/00 (2006.01)
G06T 7/80 (2017.01)
B60K 35/00 (2006.01)
B60R 11/04 (2006.01)

(52) U.S. Cl.
CPC ............... *B60R 1/00* (2013.01); *B60K 35/00* (2013.01); *B60R 11/04* (2013.01); *G06T 7/80* (2017.01); *B60K 2370/152* (2019.05); *B60K 2370/33* (2019.05); *B60K 2370/52* (2019.05); *B60R 2300/802* (2013.01); *G06T 2207/10152* (2013.01); *G06T 2207/30252* (2013.01)

(58) Field of Classification Search
CPC ............ G06T 2207/30252; G06T 7/80; G06T 2207/10152; B60K 35/00; B60K 2370/1523; B60K 2370/176; B60K 2370/349; B60K 2370/52; B60K 2370/152; B60K 2370/343; B60K 2370/33; B60R 1/00; B60R 11/04; B60R 2300/802
See application file for complete search history.

(56) References Cited

U.S. PATENT DOCUMENTS

| 2018/0018939 A1* | 1/2018 | Choi ........................ B60R 1/00 |
| 2018/0131877 A1* | 5/2018 | Amano ................. H04N 5/243 |
| 2018/0233092 A1* | 8/2018 | Du ........................... G09G 3/20 |
| 2019/0009720 A1* | 1/2019 | Omiya ..................... B60R 1/00 |

(Continued)

FOREIGN PATENT DOCUMENTS

JP 2009-067094 A 4/2009

*Primary Examiner* — Zhihan Zhou
(74) *Attorney, Agent, or Firm* — Thomas | Horstemeyer, LLP

(57) ABSTRACT

A vehicle control apparatus comprises a shooting unit configured to shoot a periphery of a vehicle, a display unit configured to display an image shot by the shooting unit, an acquisition unit configured to acquire illuminance information regarding peripheral illuminance of the vehicle, and a control unit configured to control a display mode of the display unit based on the illuminance information acquired by the acquisition unit. The control unit changes the control of the display mode of the display unit between a case where peripheral illuminance of the vehicle increases and a case where the peripheral illuminance of the vehicle decreases.

9 Claims, 9 Drawing Sheets

(56) References Cited

U.S. PATENT DOCUMENTS

| | | | | |
|---|---|---|---|---|
| 2019/0275942 A1* | 9/2019 | Shimizu | .................. | B60R 11/02 |
| 2020/0106999 A1* | 4/2020 | Okazaki | .................... | G09G 5/00 |
| 2021/0006703 A1* | 1/2021 | Ozaki | ...................... | H04N 7/18 |
| 2021/0008981 A1* | 1/2021 | Suzuki | .................. | B60K 35/00 |

* cited by examiner

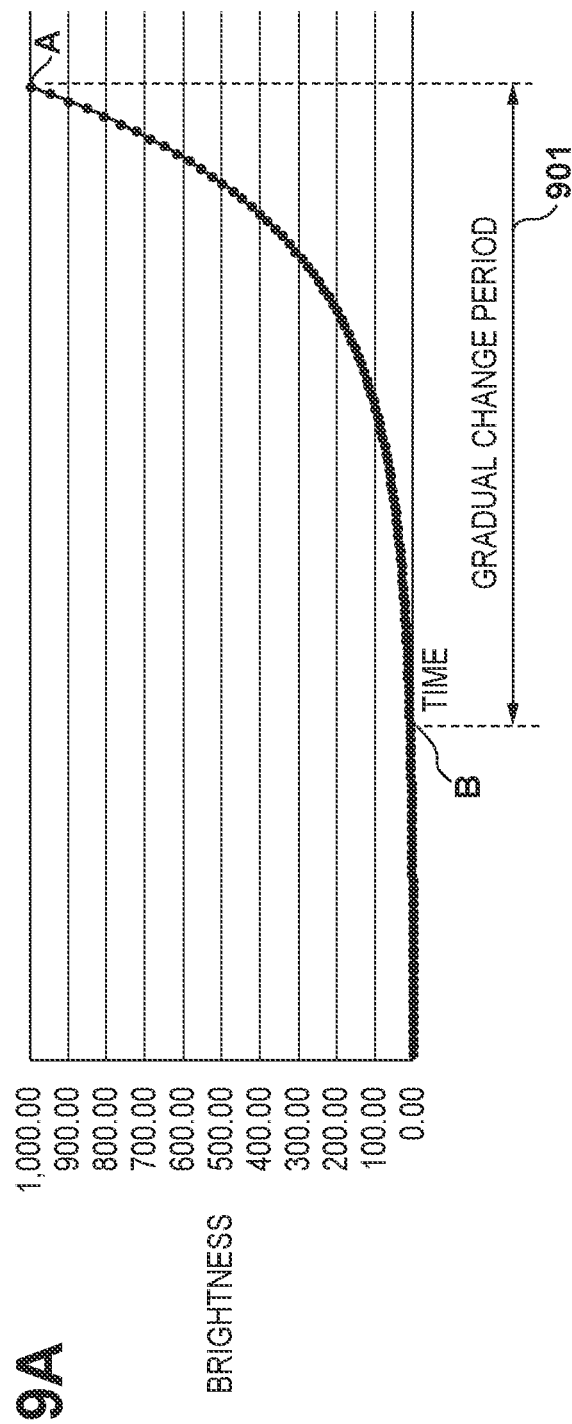
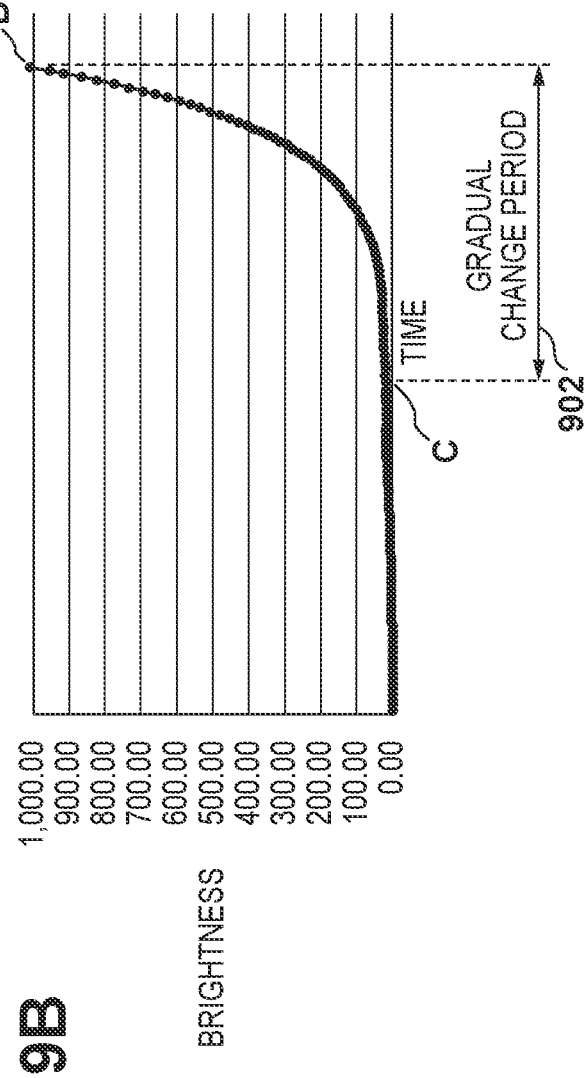

VEHICLE CONTROL APPARATUS, CONTROL METHOD, AND STORAGE MEDIUM FOR STORING PROGRAM

CROSS-REFERENCE TO RELATED APPLICATION(S)

This application claims priority to and the benefit of Japanese Patent Application No. 2018-220579 filed on Nov. 26, 2018, the entire disclosure of which is incorporated herein by reference.

BACKGROUND OF THE INVENTION

Field of the Invention

The present invention relates to a vehicle control apparatus including a peripheral monitoring system, a control method, and a storage medium for storing a program.

Description of the Related Art

Devices of a vehicle are controlled based on information detected by sensors. Japanese Patent Laid-Open No. 2009-67094 describes that a windshield wiper is driven based on a detection signal from a raindrop sensor, and lights are driven based on a detection signal from an illuminance sensor.

Meanwhile, in recent years, a door mirror-less configuration in which cameras that capture images side-rearward of the vehicle, and displays for displaying images captured by the cameras are used is being widely spread.

The displays in the door mirror-less configuration serve as a replacement for existing door mirrors, and therefore the displays need to be appropriately controlled in accordance with the peripheral illuminance of the vehicle. The fact that the displays of cameras are controlled in accordance with the illuminance outside the vehicle in the door mirror-less configuration is not described in Japanese Patent Laid-Open No. 2009-67094.

SUMMARY OF THE INVENTION

The present invention provides a vehicle control apparatus, a control method, and a storage medium for storing a program for appropriately controlling the display mode of a display in accordance with the peripheral illuminance of a vehicle.

The present invention in its first aspect provides a vehicle control apparatus including: a shooting unit configured to shoot a periphery of a vehicle; a display unit configured to display an image shot by the shooting unit; an acquisition unit configured to acquire illuminance information regarding peripheral illuminance of the vehicle; and a control unit configured to control a display mode of the display unit based on the illuminance information acquired by the acquisition unit. The control unit changes the control of the display mode of the display unit between a case where peripheral illuminance of the vehicle increases and a case where the peripheral illuminance of the vehicle decreases.

The present invention in its second aspect provides a control method to be executed in a vehicle control apparatus, the control method including: displaying an image shot by a shooting unit that shoots a periphery of a vehicle; acquiring illuminance information regarding peripheral illuminance of the vehicle; controlling a display mode of the display unit based on the acquired illuminance information; and in the controlling, changing the control of the display mode between a case where peripheral illuminance of the vehicle increases and a case where the peripheral illuminance of the vehicle decreases.

The present invention in its third aspect provides a non-transitory computer-readable storage medium storing a program causing a computer to: display an image shot by a shooting unit that shoots a periphery of the vehicle; acquire illuminance information regarding peripheral illuminance of the vehicle; and control a display mode of the display unit based on the acquired illuminance information. When the control is performed, the control of the display mode is changed between a case where peripheral illuminance of the vehicle increases and a case where the peripheral illuminance of the vehicle decreases.

According to the present invention, the display mode of a display can be appropriately controlled in accordance with the peripheral illuminance of a vehicle.

BRIEF DESCRIPTION OF THE DRAWINGS

FIGS. 9A and 9B are diagrams illustrating data for determining a gradual change period.

DESCRIPTION OF THE EMBODIMENTS

Figure 1:
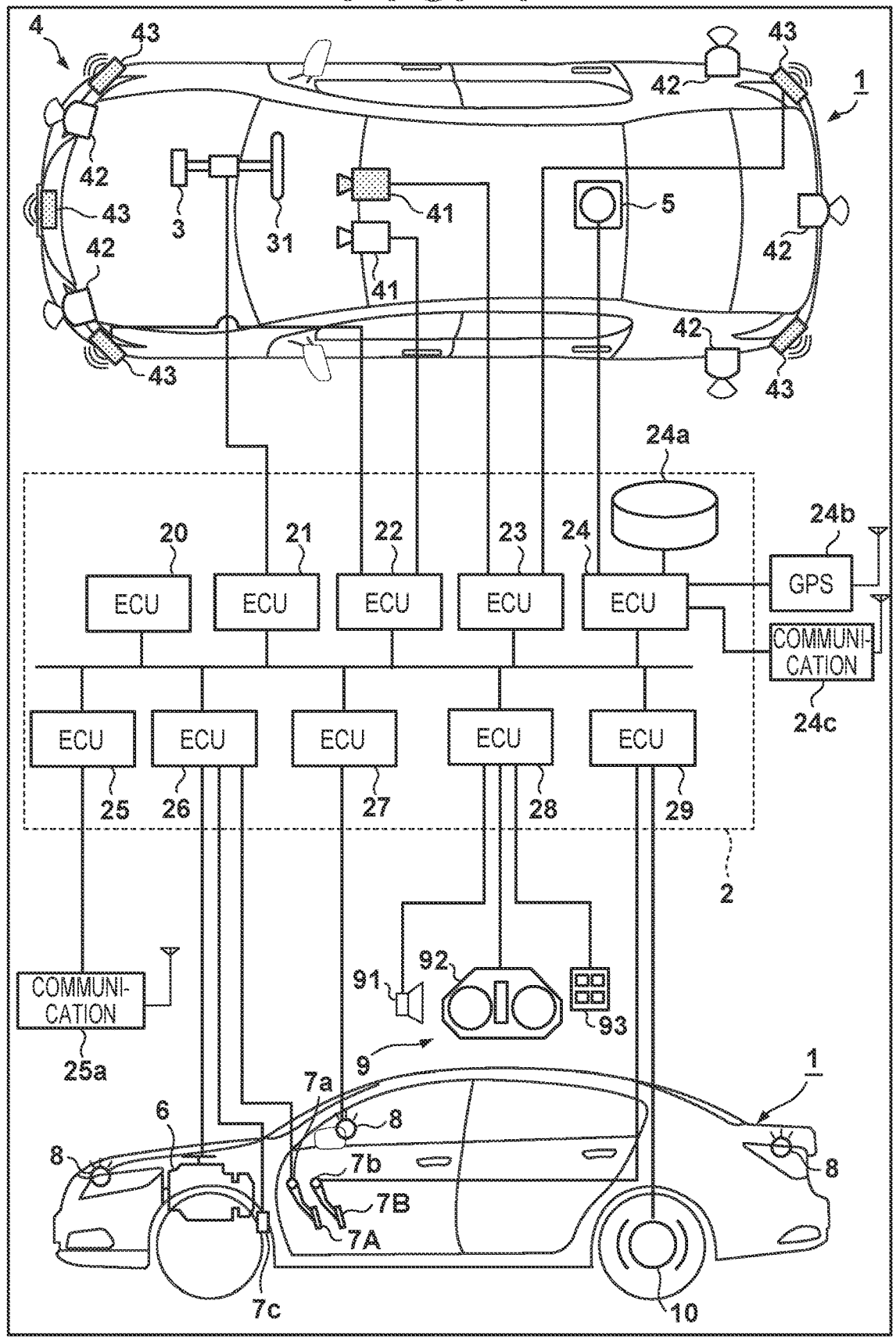
FIG. 1 is a diagram illustrating a configuration of a vehicle control apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Two or more aspects of the plurality of aspects described in the embodiments may be arbitrarily combined. The same or similar constituent elements are given the same reference numerals, and a description thereof is omitted.

FIG. 1 is a block diagram of a vehicle control apparatus that controls a vehicle 1 according to one embodiment of the present invention. In FIG. 1, the outline of the vehicle 1 is shown as a plan view and a side view. The vehicle 1 is a sedan type four-wheel passenger car, for example.

The control apparatus in FIG. 1 includes a control unit 2. The control unit 2 includes a plurality of ECUs 20 to 29 that are communicably connected through an in-vehicle network. Each ECU includes a processor represented by a CPU, a storage device such as a semiconductor memory, and an interface for an external device. The storage device stores programs to be executed by the processor, data that the processor uses in processing, and the like. Each ECU may include a plurality of processors, storage devices, and interfaces. Also, the configuration of the control apparatus in FIG. 1 may be realized by a computer that executes the method of the present invention according to a program.

Hereinafter, functions and the like of the ECUs 20 to 29 will be described. Note that the number and functions of the ECUs can be appropriately designed, and more ECUs can be used or some EUCs can be integrated.

The ECU 20 executes control relating to autonomous driving of the vehicle 1. In the autonomous driving, at least one of steering and acceleration/deceleration of the vehicle 1 is automatically controlled. In later-described exemplary control, both of steering and acceleration/deceleration are automatically controlled.

The ECU 21 controls an electric power steering apparatus 3. The electric power steering apparatus 3 includes a mechanism for steering the front wheels in accordance with the driving operation (steering operation) of a driver made on a steering wheel 31. Also, the electric power steering apparatus 3 includes a motor that exerts a driving force for assisting the steering operation or automatically steering the front wheels, a sensor for detecting the steering angle, and the like. When the driving state of the vehicle 1 is autonomous driving, the ECU 21 controls the running direction of the vehicle 1 by automatically controlling the electric power steering apparatus 3 in accordance with the instruction from the ECU 20.

The ECUs 22 and 23 control detection units 41 to 43 that detect conditions around the vehicle, and perform information processing on the detection results. The detection units 41 (hereinafter, may also be denoted as cameras 41) are cameras that captures an image forward of the vehicle 1, and is installed at a roof front part and on an interior side of the front window, in the present embodiment. The contour of an object and lane markings (such as white lines) on a road can be extracted by analyzing images captured by the cameras 41.

Detection units 42 are LIDARs (Light Detection and Ranging), and detect an object around the vehicle 1, and measure the distance to the object. In the case of the present embodiment, five detection units 42 are provided, namely one each at front corners of the vehicle 1, one at the rear center, and one each at rear side faces thereof. Detection units 43 (hereinafter, may also be denoted as radars 43) are millimeter wave radars, and detect an object around the vehicle 1, and measure the distance to the object. In the case of the present embodiment, five radars 43 are provided, namely one at the front center of the vehicle 1, one each at the front corners, and one each at rear corners.

The ECU 22 controls one of the cameras 41 and the detection units 42, and performs information processing on detection results. The ECU 23 controls the other camera 41 and the radars 43, and performs information processing on detection results. As a result of including two sets of apparatuses for detecting conditions around the vehicle, the reliability of the detection result can be improved, and as a result of including different types of detection units such as cameras and radars, the surrounding environment of the vehicle can be analyzed in a multifaceted manner.

The ECU 24 controls a gyrosensor 5, a GPS sensor 24b, and a communication apparatus 24c, and performs information processing on detection results and communication results. The gyrosensor 5 detects the rotational motion of the vehicle 1. The course of the vehicle 1 can be determined based on the detection result of the gyrosensor 5, wheel speed, and the like. The GPS sensor 24b detects the current position of the vehicle 1. The communication apparatus 24c performs wireless communication with a server that provides map information, traffic information, and weather information, and acquires these pieces of information. The ECU 24 can access a database 24a of the map information constructed in a storage device, and searches the route from the current place to a destination, and the like. Note that the database of the aforementioned traffic information and weather information may be constructed in the database 24a.

The ECU 25 includes a communication apparatus 25a for inter-vehicle communication. The communication apparatus 25a performs wireless communication with other vehicles around the vehicle 1, and exchanges information between vehicles.

The ECU 26 controls a power plant 6. The power plant 6 is a mechanism that outputs a driving force for rotating driving wheels of the vehicle 1, and includes an engine and a transmission, for example. The ECU 26 controls the engine output in response to a driving operation (accelerator pedal operation or acceleration operation) made by the driver that has been detected by an operation detection sensor 7a provided in an accelerator pedal 7A, and switches the shift stage of the transmission based on information such as vehicle speed detected by a vehicle speed sensor 7c, for example. When the driving state of the vehicle 1 is the autonomous driving, the ECU 26 automatically controls the power plant 6, and controls acceleration and deceleration of the vehicle 1, in response to the instruction from the ECU 20.

The ECU 27 controls lighting devices (such as headlight and taillight) including direction indicators 8 (winkers). In the case of the example in FIG. 1, the direction indicators 8 are provided at the front and rear of the vehicle 1 and at door mirrors.

The ECU 28 controls an input/output apparatus 9. The input/output apparatus 9 outputs information to the driver, and receives information from the driver. An audio output apparatus 91 notifies the driver of information by sound. The display apparatus 92 notifies the driver of information by displaying an image. The display apparatus 92 is arranged in front of a driving seat, for example, and constitutes an instrument panel or the like. Note that sound and display are illustrated here, but the driver may be notified of information using vibration or light. Also, the driver may be notified of information by combining two or more of sound, display, vibration, and light. Moreover, the combination or the reporting mode may be changed in accordance with the level of information (degree of urgency, for example) to be notified of. Also, the display apparatus 92 includes a navigation apparatus.

An input apparatus 93 is arranged at a position at which the driver can operate it, and is a switch group for giving instructions to the vehicle 1. The input apparatus 93 may include a voice input apparatus.

The ECU 29 controls braking apparatuses 10 and a parking brake (not illustrated). The braking apparatuses 10 are disc brake apparatuses, for example, and provided at respective wheels of the vehicle 1 in order to decelerate or stop the vehicle 1 by applying resistance to the rotation of the wheels. The ECU 29 controls the operation of the braking apparatuses 10 in response to the driving operation (brake operation) made by the driver that is detected by an operation detection sensor 7b provided at a brake pedal 7B, for example. When the driving state of the vehicle 1 is autonomous driving, the ECU 29 controls deceleration or stopping of the vehicle 1 by automatically controlling the braking apparatuses 10 in response to the instruction from the ECU 20. The braking apparatuses 10 and the parking brake can be operated to keep the vehicle 1 at a stopped state. Also, if the transmission of the power plant 6 includes a parking lock mechanism, this mechanism can be operated to keep the vehicle 1 at a stopped state.

Exemplary Control

The control relating to the autonomous driving of the vehicle 1 to be executed by the ECU 20 will be described. Upon being instructed the destination and the autonomous driving by the driver, the ECU 20 automatically controls the traveling of the vehicle 1 toward the destination in accordance with the guide route retrieved by the ECU 24. When automatic control is performed, the ECU 20 acquires information (outside information) regarding the conditions around the vehicle 1 from the ECUs 22 and 23, and controls steering and acceleration and deceleration of the vehicle 1 by instructing the ECUs 21, 26, and 29 based on the acquired information.

Figure 2:
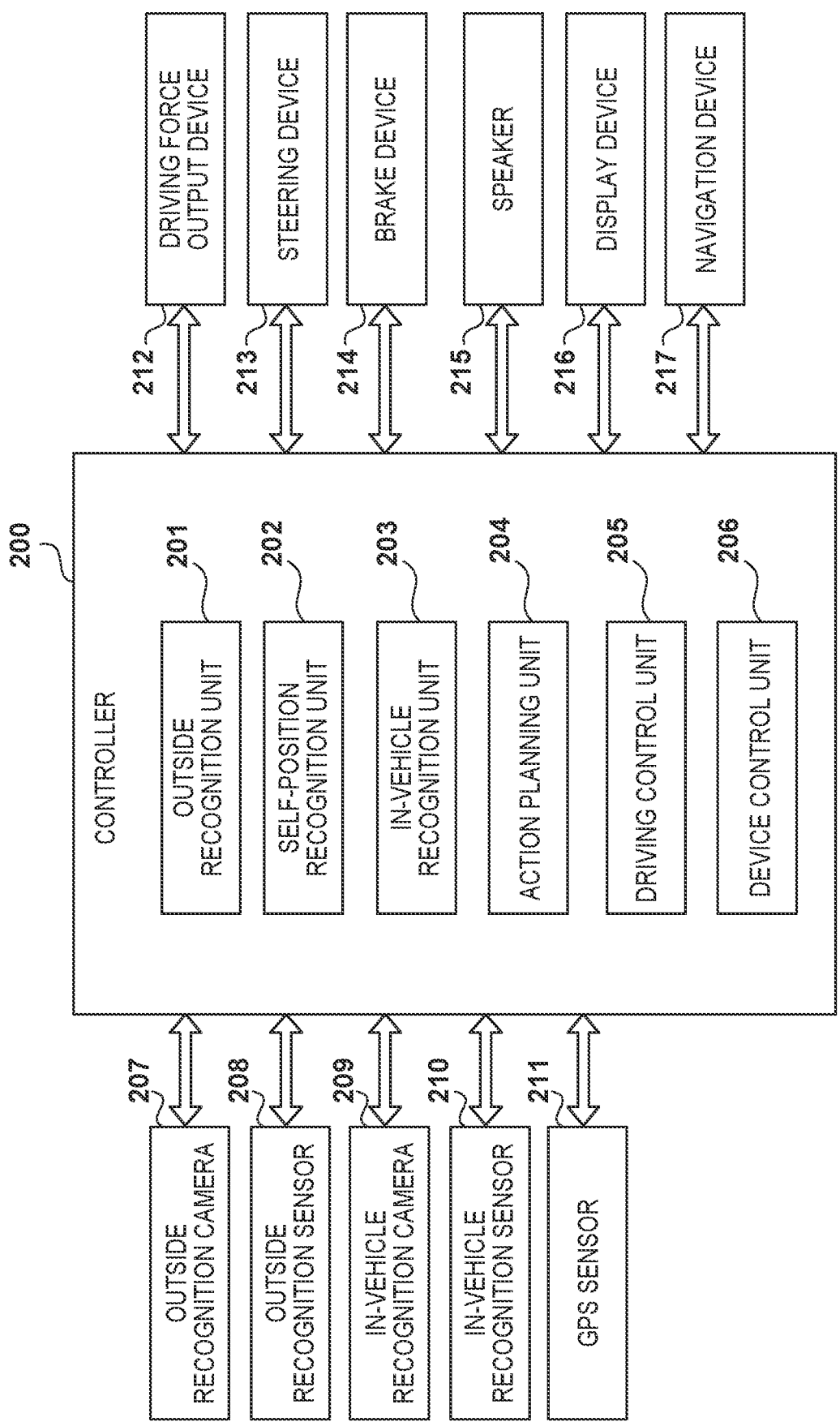
FIG. 2 is a diagram illustrating functional blocks of a control unit.

FIG. 2 is a diagram illustrating the functional blocks of the control unit 2. A controller 200 corresponds to the control unit 2 in FIG. 1, and includes an outside recognition part 201, a self-position recognition part 202, an interior recognition part 203, an action planning part 204, a driving controller 205, and a device controller 206. Each block can be realized by one ECU or a plurality of ECUs shown in FIG. 1.

The outside recognition part 201 recognizes the outside information of the vehicle 1 based on signals from outside recognition cameras 207 and outside recognition sensors 208. Here, the outside recognition cameras 207 are the cameras 41 in FIG. 1, for example, and the outside recognition sensors 208 are constituted by the detection units 42 and 43 in FIG. 1, for example. The outside recognition part 201 recognizes the scene such as an intersection, a railroad crossing, and a tunnel, a free space such as a road shoulder, and behaviors (speeds and running directions) of other vehicles, for example, based on signals from the outside recognition cameras 207 and the outside recognition sensors 208. The self-position recognition part 202 recognizes the current position of the vehicle 1 based on the signal from the GPS sensor 211. Here, the GPS sensor 211 corresponds to the GPS sensor 24b in FIG. 1, for example.

The interior recognition part 203 identifies a passenger in the vehicle 1, and also recognizes the state of the passenger, based on signals from an interior recognition camera 209 and an interior recognition sensor 210. The interior recognition camera 209 is a near infrared camera installed on the display apparatus 92 in the interior of the vehicle 1, for example, and detects the line of sight direction of the passenger, for example. Also, the interior recognition sensor 210 is a sensor that detects a biological signal of the passenger, for example. The interior recognition part 203 recognizes the state of the passenger such as a dozing state or a working state other than driving based on these signals.

The action planning part 204 plans the action of the vehicle 1 such as an optimum route or a risk aversion route based on the results of recognition by the outside recognition part 201 and the self-position recognition part 202. The action planning part 204 performs entering determination based on a start point and an end point of an intersection, a railroad crossing, or the like, and action planning based on behavior prediction of other vehicles, for example. The driving controller 205 controls a driving force output device 212, a steering device 213, and a braking device 214 based on the action plan made by the action planning part 204. Here, the driving force output device 212 corresponds to the power plant 6 in FIG. 1, the steering device 213 corresponds to the electric power steering apparatus 3 in FIG. 1, and the braking device 214 corresponds to the braking apparatus 10, for example.

The device controller 206 controls devices that are connected to the controller 200. For example, the device controller 206 controls a speaker 215, and causes the speaker 215 to output a predetermined voice message such as a warning or a message for navigation. Also, the device controller 206 controls a display device 216, and causes the display device 216 to display a predetermined interface, for example. The display device 216 corresponds to the display apparatus 92, for example. Also, the device controller 206 controls the navigation device 217, and acquires information set in the navigation device 217, for example.

The controller 200 may appropriately include functional blocks other than those shown in FIG. 2, and may include an optimum route calculation part that calculates an optimum route to the destination based on map information acquired via the communication apparatus 24c, for example. Also, the controller 200 may acquire information from devices other than the cameras and sensors shown in FIG. 2, and may acquire information regarding another vehicle via the communication apparatus 25a, for example. Also, the controller 200 receives detection signals from various sensors provided in the vehicle 1 in addition to the GPS sensor 211. For example, the controller 200 receives detection signals of door open/close sensors and doorlock mechanism sensors that are provided at doors of the vehicle 1 via ECUs installed at the doors. With this, the controller 200 can detect canceling of the doorlocks and opening/closing operations of the doors.

Figure 3:
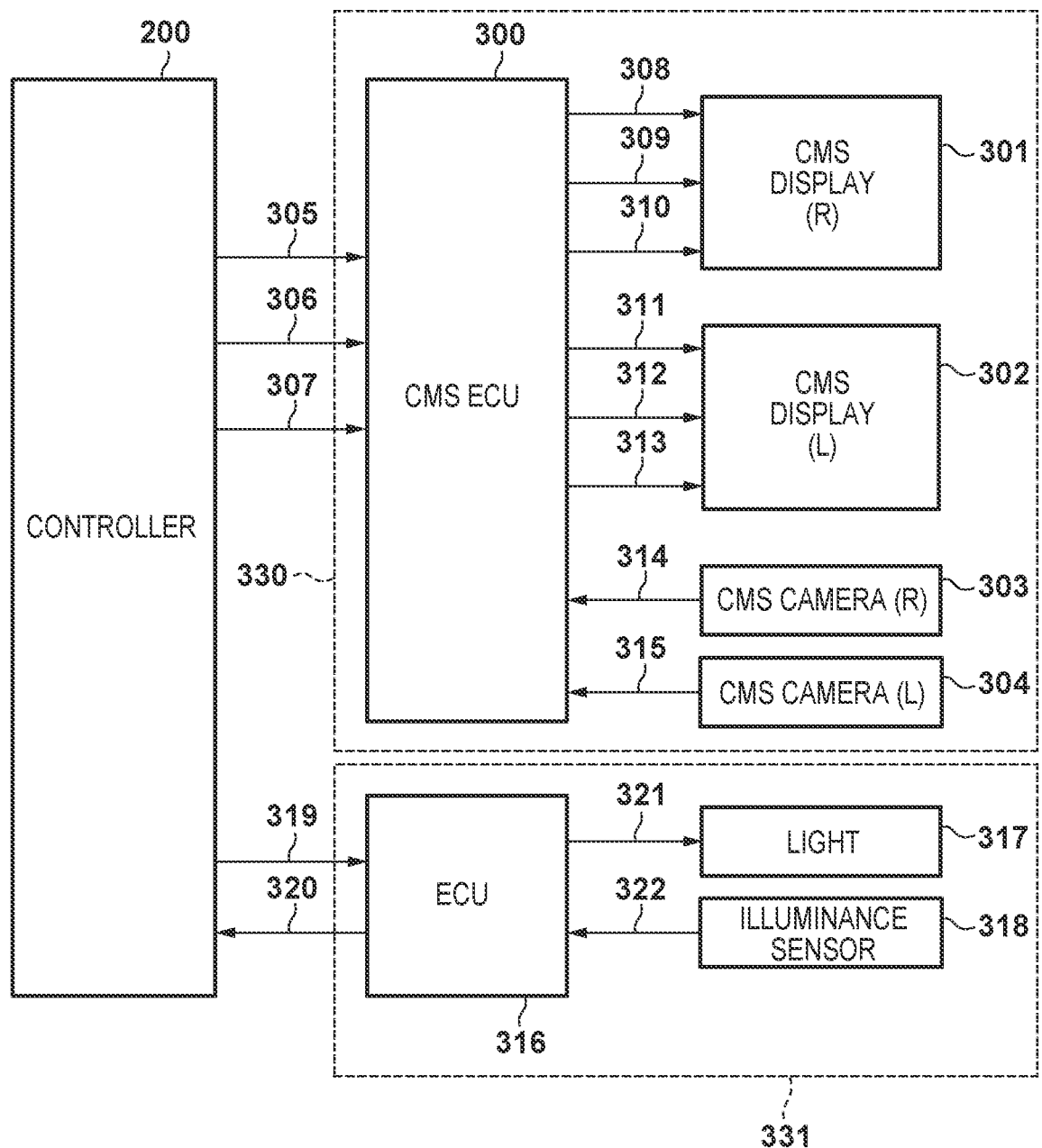
FIG. 3 is a diagram illustrating a connection configuration between a controller and a CMS and an automated lighting system.
Figure 4:
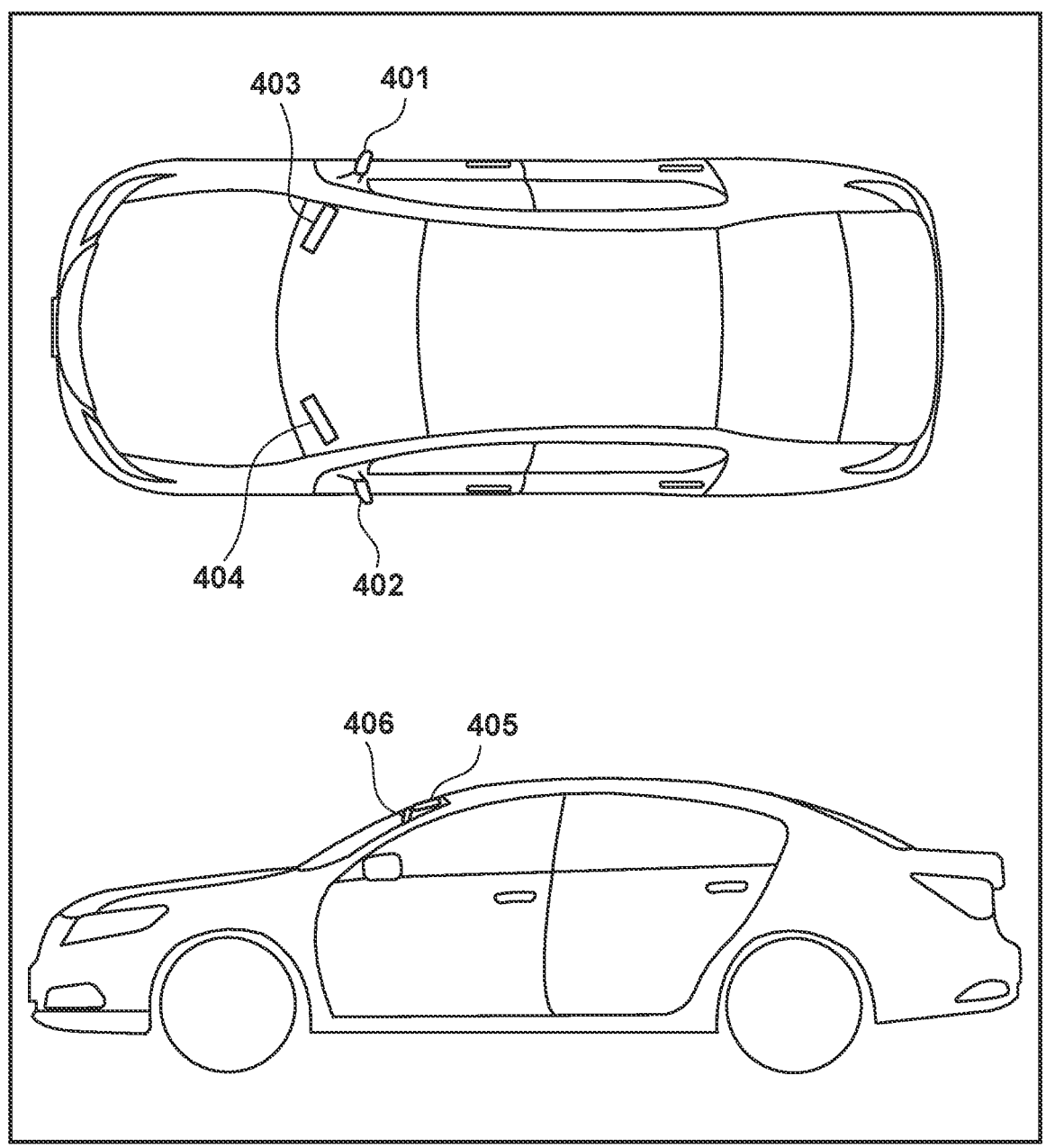
FIG. 4 is a diagram illustrating installation positions of cameras, displays, and illuminance sensors.

Also, a camera monitoring system (CMS, peripheral monitoring system) and an automated lighting system are connected to the controller 200. FIG. 3 is a diagram illustrating the connection configuration between the controller 200 and a CMS 330 and automated lighting system 331. In the present embodiment, the vehicle 1 is a so-called door mirror-less vehicle in which cameras that capture images rearward of the vehicle 1 is provided in place of the door mirrors. As shown in FIG. 4, cameras 401 and 402 are installed at positions of door mirrors of the vehicle 1. The camera 401 is a camera that captures an image right rearward of the vehicle 1, and the rearward image captured by the camera 401 is displayed in the display 403. Also, the camera 402 is a camera that captures an image left rearward of the vehicle 1, and the rearward image captured by the camera 402 is displayed in the display 404.

The CMS 330 includes a CMS-ECU 300, a CMS display 301, a CMS display 302, a CMS camera 303, and a CMS camera 304. The CMS camera 303 corresponds to the camera 401 in FIG. 4, and the CMS camera 304 corresponds to the camera 402 in FIG. 4. Also, the CMS display 301 corresponds to the display 403 in FIG. 4, and the CMS display 302 corresponds to the display 404 in FIG. 4.

The CMS-ECU 300 integrally control the CMS 330 under the control of the controller 200. The CMS 330 receives a forward illuminance signal 305, an upper illuminance signal 306, and a brightness step value signal 307 from the controller 200. The forward illuminance signal 305 and upper illuminance signal 306 correspond to illuminance signals detected by later-described illuminance sensors 318. The brightness step value signal 307 is a signal for designating the change in brightness of the CMS displays 301 and 302, and will be described later.

In the present embodiment, the CMS displays 301 and 302 changes the brightness of liquid crystal displays thereof in accordance with the peripheral illuminance (brightness)

of the vehicle 1. For example, when in a daytime, the brightness of the CMS displays 301 and 302 is increased in accordance with the peripheral illuminance of the vehicle 1. Also, when at twilight or night, the brightness of the CMS displays 301 and 302 is decreased in accordance with the peripheral illuminance of the vehicle 1, for example. The CMS-ECU 300 receives an imaging signal 314 generated by capturing performed by the CMS camera 303 from the CMS camera 303, converts the signal to display rendering data, and transmits the display rendering data to the CMS display 301 as image capturing data 308. Also, the CMS-ECU 300 receives an imaging signal 315 generated by capturing performed by the CMS camera 304 from the CMS camera 304, converts the signal to display rendering data, and transmits the display rendering data to the CMS display 302 as image capturing data 311.

The CMS-ECU 300 transmits the brightness signal 309 to the CMS display 301, and transmits the brightness signal 312 to the CMS display 302. The brightness signals 309 and 312 are associated with the brightness on the correspondence relation between peripheral illuminance and brightness that is determined by the brightness step value signal 307.

Figure 8:
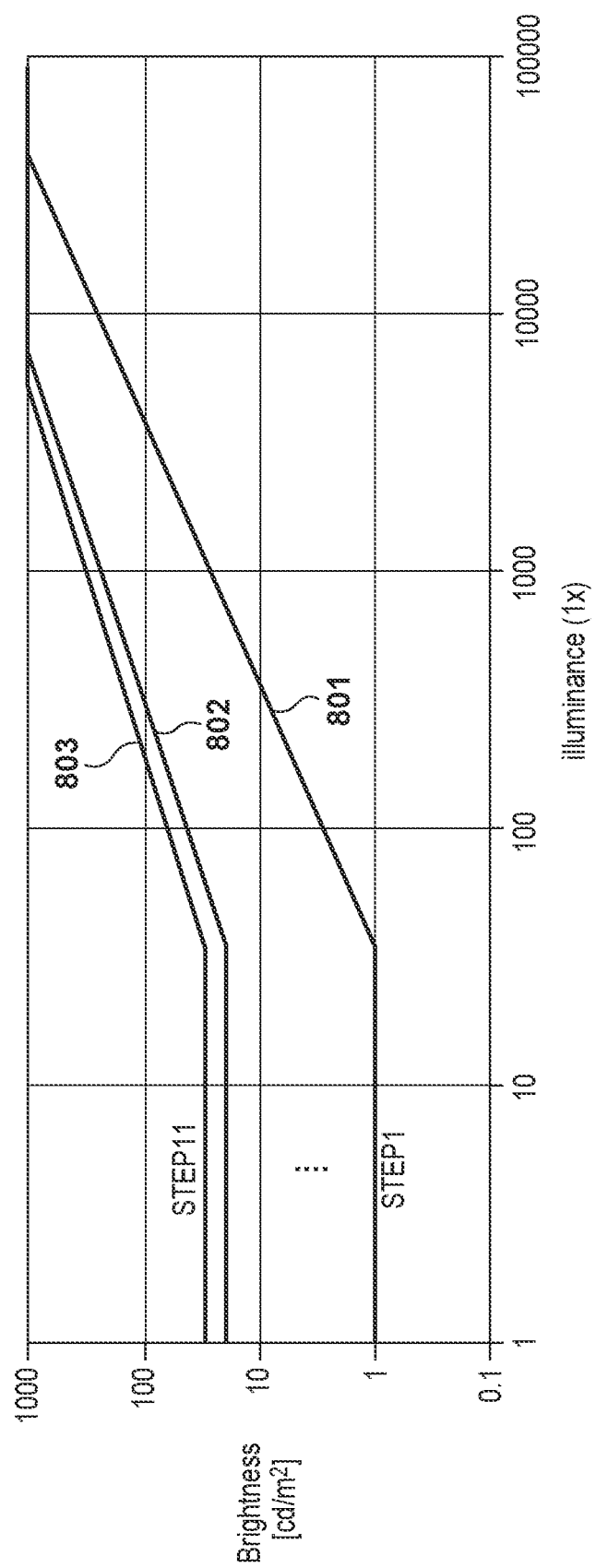
FIG. 8 is a diagram illustrating the correspondence relation between peripheral illuminance and brightness.

Here, the brightness step value will be described. FIG. 8 is a diagram illustrating the correspondence relation between peripheral illuminance and brightness for defining how the brightness of a display is changed in accordance with the peripheral illuminance of the vehicle 1. For example, the brightness step value 801 (STEP1) in FIG. 8 defines that the brightness of a display linearly changes in a range from 1 to 1,000 [cd/m$^2$] in accordance with the change of the peripheral illuminance of the vehicle 1 in a range from 30 [lx] to 30,000 [lx]. Also, in the present embodiment, a plurality of types of correspondence relations between peripheral illuminance and brightness are provided in addition to the brightness step value 801, and FIG. 8 shows the brightness step value 801 (STEP1), a brightness step value 802 (STEP10), and a brightness step value 803 (STEP11), out of eleven types of correspondence relations. Also, these plurality of types of correspondence relations are identifiable, and the brightness step values represent pieces of identification information for identifying the respective correspondence relations. The driver sets a desired brightness step value on a setting screen displayed in the display device 216. With such a configuration, the driver can designate a desired change in brightness of the CMS displays 301 and 302 with respect to the peripheral illuminance of the vehicle 1. The correspondence relation in FIG. 8 is retained in the CMS-ECU 300, and upon receiving the brightness step value signal 307, the CMS-ECU 300 adopts the correspondence relation identified by the brightness step value.

The CMS-ECU 300 further transmits gradual change period information 310 to the CMS display 301, and transmits gradual change period information 313 to the CMS display 302. Here, the gradual change period refers to a period for the brightness to change to target brightness in response to the change in peripheral illuminance. The CMS displays 301 and 302 operate as replacements for door mirrors, and therefore the brightness needs to be changed in response to the change in peripheral illuminance. Therefore, the CMS-ECU 300 changes the brightness of the CMS displays 301 and 302 based on the brightness step value and the gradual change period.

The automated lighting system 331 includes an ECU 316, lights 317, and illuminance sensors 318. The lights 317 are a headlight and a taillight, for example. Also, the illuminance sensors 318 are sensors for detecting the peripheral illuminance of the vehicle 1. In the present embodiment, the illuminance sensors 318 include an upper illuminance sensor 405 and a forward illuminance sensor 406. As shown in FIG. 4, the upper illuminance sensor 405 is installed on an interior side of the front window behind a rearview mirror, and detects upper illuminance of the vehicle 1. Also, the forward illuminance sensor 406 is installed on the interior side of the front window behind the rearview mirror, and detects forward illuminance of the vehicle 1. In the present embodiment, rain-light sensors are used as the illuminance sensors 318, for example.

The ECU 316 integrally controls the automated lighting system 331 under the control of the controller 200. When the peripheral illuminance of the vehicle 1 has decreased to a threshold value or less, the automated lighting system 331 automatically turns on the headlight. The ECU 316 receives the upper illuminance and forward illuminance detected by the illuminance sensors 318 from the illuminance sensors 318 as illuminance signals 322, and controls the light amounts of the lights 317 using control signals 321. Also, the ECU 316 includes the illuminance signals 322 from the illuminance sensors 318 in a signal 320, and transmits the signal 320 to the controller 200. The controller 200 recognizes the upper illuminance detected by the upper illuminance sensor 405 and the forward illuminance detected by the forward illuminance sensor 406 based on the signal 320, and transmits the recognized illuminance to the CMS-ECU 300 as the forward illuminance signal 305 and the upper illuminance signal 306.

The controller 200 performs various types of control on the ECU 316 using a control signal 319. For example, when an ON/OFF setting or the like of the automatic lighting function is received from the driver via the display device 216, the controller 200 controls the ECU 316 using the control signal 319. Also, when the automatic lighting function is OFF, the controller 200 can also instruct the control amounts of light amounts of the lights 317 to the ECU 316 using the control signal 319.

Here, the brightness control of the CMS displays 301 and 302 in the present embodiment will be described with reference to FIGS. 5A and 5B.

Figure 5A:
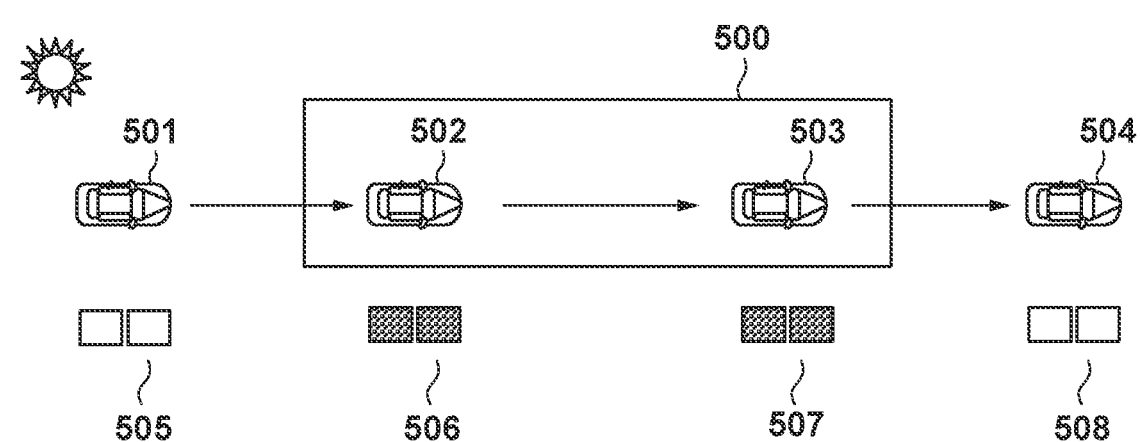
FIGS. 5A and 5B are diagrams illustrating brightness control of a CMS display.

FIG. 5A shows a manner in which the position of the vehicle 1 changes by traveling from a position 501 to a position 502, a position 503, and a position 504. Also, the position 501 is a position before entering a tunnel 500, the positions 502 and 503 are positions inside the tunnel 500, and the position 504 is a position after exiting the tunnel 500. Specifically, the position 502 indicates a vicinity of the tunnel entrance, and the position 503 indicates a vicinity of the tunnel exit. Also, FIG. 5A shows a case of daytime traveling of the vehicle 1. Also, displays 505, 506, 507, and 508 show a manner in which the brightness of the CMS displays 301 and 302 changes.

As shown in the display 505, at the position 501, the brightness of the CMS displays 301 and 302 is relatively high in accordance with daytime peripheral illuminance. Also, when the vehicle 1 enters the tunnel 500, the brightness of the CMS displays 301 and 302 at the positions 502 and 503 decreases in accordance with the peripheral illuminance inside the tunnel 500, as shown in the displays 506 and 507. Also, when the vehicle 1 exits the tunnel 500, the brightness of the CMS displays 301 and 302 at the position 504 increases in accordance with daytime peripheral illuminance, as shown in the display 508.

Figure 5B:
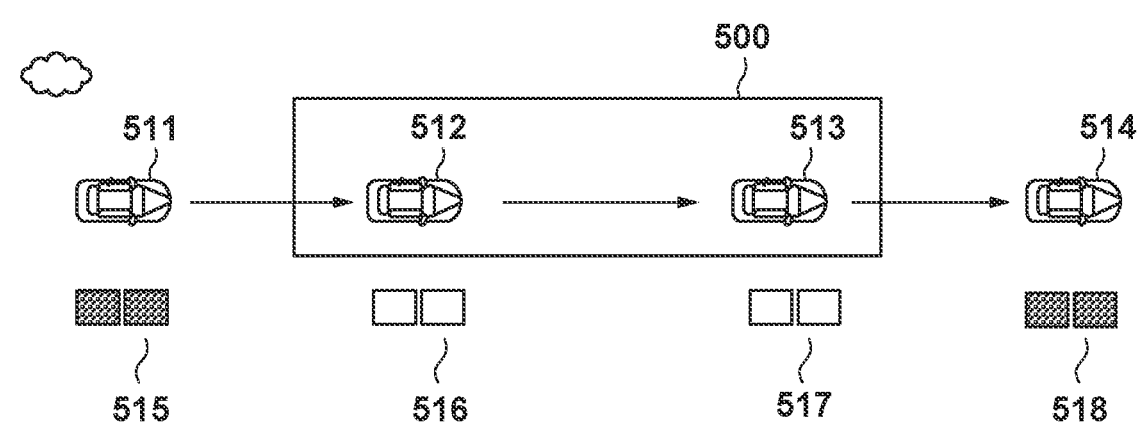

FIG. 5B shows a manner in which the position of the vehicle 1 changes by traveling from a position 511 to a position 512, a position 513, and a position 514. Also, the position 511 is a position before entering a tunnel 500, the positions 512 and 513 are position inside the tunnel 500, and the position 514 is a position after exiting the tunnel 500. Specifically, the position 512 indicates the vicinity of the tunnel entrance, and the position 513 indicates the vicinity of the tunnel exit. Also, FIG. 5B shows a case of twilight (or night) traveling of the vehicle 1. Also, displays 515, 516, 517, and 518 show a manner in which the brightness of the CMS displays 301 and 302 changes.

As shown in display 515, at the position 511, the brightness of the CMS displays 301 and 302 is relatively low in accordance with twilight peripheral illuminance. Also, when the vehicle 1 enters the tunnel 500, the brightness of the CMS displays 301 and 302 at the positions 512 and 513 increases in accordance with the peripheral illuminance inside the tunnel 500, as shown in the displays 516 and 517. Also, when the vehicle 1 exits the tunnel 500, the brightness of the CMS displays 301 and 302 at the position 514 decreases in accordance with twilight peripheral illuminance, as shown in the display 518.

In the present embodiment, different types of control are performed between the case of decreasing the brightness and the case of increasing the brightness, in the brightness control of the CMS displays 301 and 302, as shown in FIGS. 5A and 5B. Specifically, control is performed such that the change period of brightness is reduced in the case of increasing the brightness relative to the case of decreasing the brightness. That is, in FIG. 5A, control is performed such that the change period of brightness is reduced in the case of exiting the tunnel (position 503 to position 504) relative to the case of entering the tunnel (position 501 to position 502). Also, in FIG. 5B, control is performed such that the change period of brightness is reduced in the case of entering the tunnel (position 511 to position 512) relative to the case of exiting the tunnel (position 513 to position 514).

The CMS cameras 303 and 304 operate as replacements for door mirrors, and therefore capture an image rearward of the vehicle 1. That is, in FIG. 5A, when the vehicle 1 is located at the position 502, the CMS cameras 303 and 304 are still capturing an image in a bright space external to the tunnel 500 (daytime). Therefore, even if control is performed when the vehicle 1 enters the tunnel 500 so as to decrease the brightness, since an image in a bright space is captured, the change period of brightness does not substantially influence the visibility of the driver. On the other hand, when the vehicle 1 is located at the position 504, the CMS cameras 303 and 304 are still capturing an image in a dark space inside the tunnel 500. Therefore, when the vehicle 1 exits the tunnel 500 and control is performed so as to increase the brightness, since an image in a dark space is captured, the brightness needs to be rapidly increased in accordance with the daytime bright space.

The case of FIG. 5B is opposite to the case in FIG. 5A. That is, in FIG. 5B, when the vehicle 1 is located at the position 514, the CMS cameras 303 and 304 are still capturing an image in a bright space inside the tunnel 500. Therefore, even if control is performed when the vehicle 1 exits the tunnel 500 so as to decrease the brightness, since an image in a bright space is captured, the change period of brightness does not substantially influence the visibility of the driver. On the other hand, when the vehicle 1 is located at the position 512, the CMS cameras 303 and 304 are still capturing an image in a dark space outside the tunnel 500. Therefore, when the vehicle 1 enters the tunnel 500 and control is performed so as to increase the brightness, since an image in a dark space is captured, the brightness needs to be rapidly increased in accordance with the bright space inside the tunnel 500.

Accordingly, in the present embodiment, as a result of decreasing the change period of brightness in the case of increasing the brightness relative to the case of decreasing the brightness, the reduction in visibility of the driver can be prevented.

Figure 6:
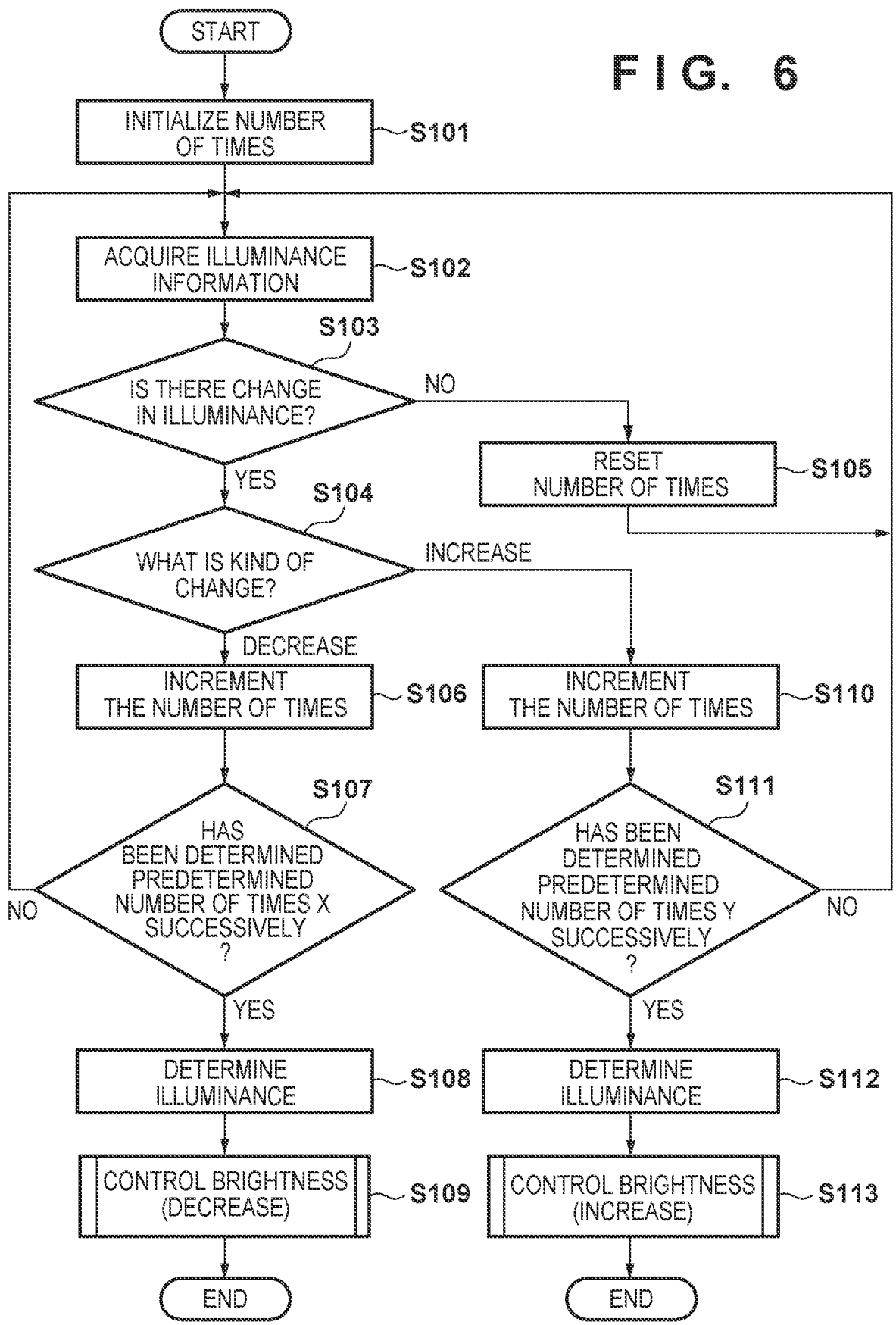
FIG. 6 is a flowchart illustrating brightness control processing of the CMS display.

FIG. 6 is a flowchart illustrating the brightness control processing of the CMS displays 301 and 302 in the present embodiment. Each piece of processing in FIG. 6 can be realized by the controller 200 reading out a program stored in a storage region such as a ROM and executing the program, for example.

In step S101, the controller 200 secures a variable for storing the number of times of changing illuminance, in a storage region such as a memory, and initialize the variable to zero. In step S102, the controller 200 acquires peripheral illuminance information (hereinafter, illuminance) detected by the illuminance sensors 318 through the signal 320. For example, the controller 200 monitors the illuminance detected by the illuminance sensors 318 at predetermined time intervals.

One of the upper illuminance sensor 405 and the forward illuminance sensor 406 may be monitored, or the larger one of the pieces of illuminance detected by the upper illuminance sensor 405 and the forward illuminance sensor 406 may be detected, as the sensing data of the illuminance sensors 318 to be monitored by the controller 200. Also, a configuration may be adopted in which the illuminance sensor to be monitored is changed between the case of entering the tunnel 500 and the case of exiting the tunnel 500. For example, the illuminance detected by the forward illuminance sensor 406 is monitored when entering the tunnel 500, and the illuminance detected by the upper illuminance sensor 405 is monitored when exiting the tunnel 500. Alternatively, a reversed configuration may be adopted.

In step S103, the controller 200 determines whether or not the illuminance has changed. For example, the controller 200 determines that the illuminance has changed when the illuminance has changed by a predetermined amount of illuminance. Here, if it has been determined that the illuminance has changed, the processing is advanced to step S104. On the other hand, if it has determined that the illuminance has not changed, in step S105, the controller 200 resets the number of times stored in the variable secured in step S101 to zero. Thereafter, the processing from step S102 onward is repeated.

In step S104, the controller 200 determines whether the change (variation) determined in step S103 is a decrease in illuminance or an increase in illuminance. If it has been determined that the illuminance has decreased, the processing is advanced to step S106, and the controller 200 increments the number of times stored in the variable by one. Then, the processing is advanced to step S107, and the controller 200 determines whether or not the decrease in illuminance has been determined X times successively. Here, if it has been determined that the decrease in illuminance has been determined X times successively, for example five times successively, the processing is advanced to step S108, and the controller 200 determines the illuminance that has been decreased. Then, in step S109, the controller 200 performs control (described later) such that the brightness of the CMS displays 301 and 302 is decreased. Thereafter, the processing in FIG. 6 is ended. If it has been determined, in step S107, that the decrease in illuminance has not been determined X times successively, for example, the decrease in illuminance has still been determined three times successively, the processing from step S102 onward is repeated.

If it has been determined that the illuminance has increased in step S104, the processing is advanced to step S110, and the controller 200 increments the number of times stored in the variable by one. Then, the processing is advanced to step S111, and the controller 200 determines whether or not the increase in illuminance has been determined Y times successively. Here, if it has been determined that the increase in illuminance has been determined Y times successively, for example three times successively, the processing is advanced to step S112, and the controller 200 determines the illuminance that has been increased. Then, in step S113, the controller 200 performs control (described later) such that the brightness of the CMS displays 301 and 302 is increased. Thereafter, the processing in FIG. 6 is ended. If it has been determined, in step S111, that the increase in illuminance has not been determined Y times successively, for example, the increase in illuminance has still been determined twice successively, the processing from step S102 onward is repeated.

The number of times X, which serves as the determination criterion in step S107, and the number of times Y, which serves as the determination criterion in step S111 are set such that number of times X≥number of times Y. According to such a configuration, specifically in the case of number of times X>number of times Y, the relationship "period of time until the illuminance is determined in steps from step S102 to step S108">"period of time until the illuminance is determined in steps from step S102 to step S112" (1.8 sec>0.6 sec, for example) is satisfied, and therefore the timing at which the brightness is changed can be made earlier when increasing the brightness.

Figure 7:
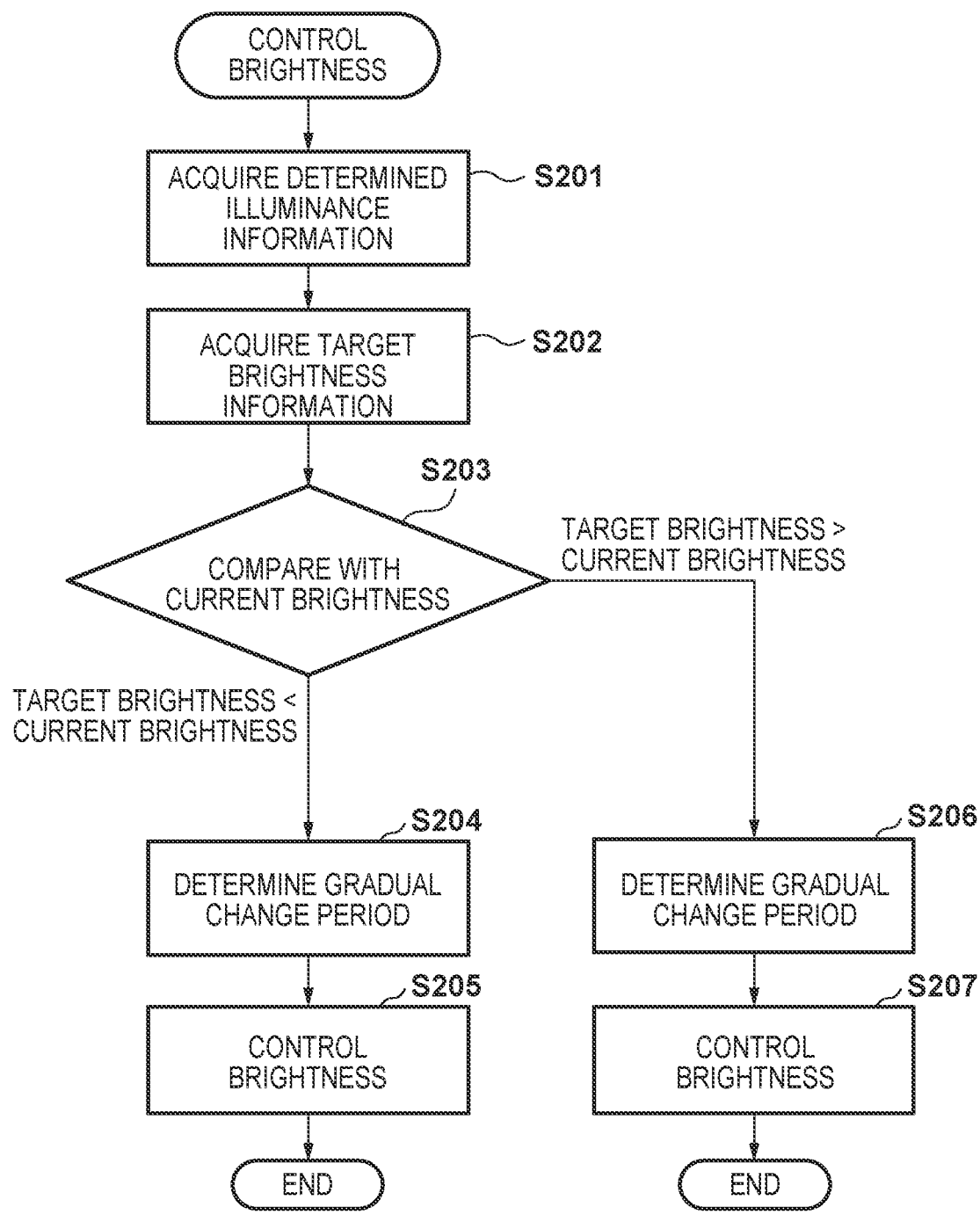
FIG. 7 is a flowchart illustrating brightness control processing.

FIG. 7 is a flowchart illustrating processing of brightness control in steps S109 and S113. Each processing in FIG. 7 will be described as being executed by the CMS-ECU 300 under the control of controller 200, but the processing may be executed by the controller 200, for example.

First, the case of step S109 will be described. In step S201, the CMS-ECU 300 acquires the illuminance that has decreased and determined in step S108 from the controller 200. Next, in step S202, the CMS-ECU 300 acquires target brightness information. For example, the CMS-ECU 300 refers to the correspondence relation between the peripheral illuminance and the brightness, in association with the brightness step value, of the brightness step values in FIG. 8, that has been designated by the driver. Also, the controller 200 acquires the brightness in association with the illuminance that has decreased and has been determined, as the target brightness.

Also, in step S203, the CMS-ECU 300 compares the current brightness and the target brightness. In this case, since the illuminance has decreased, the relationship "target brightness<current brightness" is satisfied. Therefore, the processing is advanced from step S203 to step S204. In step S204, the CMS-ECU 300 determines the gradual change period, which is the period during which the brightness changes. In the present embodiment, the CMS-ECU 300 retains data for determining the gradual change period.

FIGS. 9A and 9B are diagrams illustrating an example of data for determining the gradual change period. Although the data is shown in a graph format in FIGS. 9A and 9B, the data may be retained in another format such as a table. In this case, the controller 200 determines the gradual change period by referring to the data in FIG. 9A. As shown in FIG. 9A, the brightness and the period of time are associated, and the CMS-ECU 300 acquires and determines the gradual change period 901 (10 sec, for example) based on the current brightness A and the target brightness B acquired in step S202.

Also, in step S205, the CMS-ECU 300 controls the brightness by transmitting, to the CMS display 301, the target brightness and the gradual change period using the brightness signal 309 and the gradual change period information 310. Also, the CMS-ECU 300 controls the brightness by transmitting, to the CMS display 302, the target brightness and the gradual change period using the brightness signal 312 and the gradual change period information 313. After step S205, the processing in FIG. 7 is ended.

Next, the case in step S113 will be described. In step S201, the CMS-ECU 300 acquires the illuminance that has increased and has been determined in step S112 from the controller 200. For example, the CMS-ECU 300 refers to the correspondence relation between the peripheral illuminance and the brightness in association with the brightness step value, of the brightness step values in FIG. 8, that has been designated by the driver. Also, the controller 200 acquires the brightness in association with the illuminance that has increased and has been determined, as the target brightness.

Also, in step S203, the CMS-ECU 300 compares the current brightness and the target brightness. In this case, since the illuminance has increased, the relationship "target brightness>current brightness" is satisfied. Therefore, the processing is advanced from step S203 to step S206. In step S206, the CMS-ECU 300 determines the gradual change period, which is the period during which the brightness changes.

In this case, the controller 200 determines the gradual change period by referring to the data in FIG. 9B. The brightness and the period of time are associated, as shown in FIG. 9B, and the CMS-ECU 300 acquires and determines the gradual change period 902 (0.4 seconds, for example) based on current brightness C and target brightness D acquired in step S202.

Also, in step S207, the CMS-ECU 300 controls the brightness by transmitting, to the CMS display 301, the target brightness and the gradual change period using the brightness signal 309 and the gradual change period information 310. Also, the CMS-ECU 300 controls the brightness by transmitting, to the CMS display 302, the target brightness and the gradual change period using the brightness signal 312 and the gradual change period information 313. After step S207, the processing in FIG. 7 is ended.

As shown in FIGS. 9A and 9B, the correspondence relation in FIG. 9B is determined such that the change is steep, that is, the change speed is faster, relative to the correspondence relation in FIG. 9A. Therefore, if the current brightness A is the same as the target brightness D, and the current brightness C is the same as the target brightness B, the gradual change period obtained from the data in FIG. 9B is shorter than the gradual change period obtained from the data in FIG. 9A.

As described above, according to the present embodiment, the change period of brightness is reduced when the brightness is increased relative to when the brightness is decreased, and as a result, the reduction in visibility of the driver can be prevented.

SUMMARY OF EMBODIMENT

A vehicle control apparatus of the embodiment described above includes: a shooting unit (CMS camera 303, 304) configured to shoot a periphery of a vehicle; a display unit (CMS display 301, 302) configured to display an image shot by the shooting unit; an acquisition unit (CMS-ECU 300) configured to acquire illuminance information regarding peripheral illuminance of the vehicle; and a control unit (CMS-ECU 300) configured to control a display mode of the display unit based on the illuminance information acquired by the acquisition unit. The control unit changes the control of the display mode of the display unit between the case where peripheral illuminance of the vehicle increases and the case where the peripheral illuminance of the vehicle decreases (FIG. 6). Also, the control unit performs control such that the change of the display mode of the display unit differs between the case where the peripheral illuminance of the vehicle increases and the case where the peripheral illuminance of the vehicle decreases (FIG. 7).

With such a configuration, the display mode of the CMS display can be appropriately controlled in accordance with the change in the peripheral illuminance of the vehicle, for example.

Also, the control unit performs control such that the timing at which the display mode of the display unit changes is set earlier when the peripheral illuminance of the vehicle increases than when the peripheral illuminance of the vehicle decreases (steps S107 and S111). Also, when the illuminance indicated by the illuminance information has changed by a predetermined amount, the acquisition unit determines the illuminance after the change, and acquires the determined illuminance information. The control unit performs control such that the period of time until the acquisition unit acquires the determined illuminance information is shorter when the peripheral illuminance of the vehicle increases than when the peripheral illuminance of the vehicle decreases (steps S107 and S111).

With such a configuration, the display mode of the CMS display can be controlled by controlling the period of time until the determined illuminance information is acquired, for example.

Also, the control unit performs control such that the change speed of the display mode of the display unit increases when the peripheral illuminance of the vehicle increases relative to when the peripheral illuminance of the vehicle decreases (FIGS. 9A and 9B).

With such a configuration, the display mode of the CMS display can be controlled by controlling the change speed of the display mode, for example.

Also, the display unit displays an image shot by the shooting unit while the shooting unit is performing shooting. Also, the shooting unit shoots an image side-rearward of the vehicle (401, 402).

With such a configuration, while an image side-rearward of the vehicle is being shot, the shot image can be displayed in the CMS display.

Also, the acquisition unit acquires at least one of information regarding forward illuminance of the vehicle and information regarding upper illuminance of the vehicle (405, 406).

With such a configuration, the display mode of the CMS display can be controlled using illuminance sensors that detect forward and upper illuminance of the vehicle.

Also, the vehicle control apparatus further includes a recognition unit (controller 200) configured to recognize the travel scene of the vehicle, and when traveling of the vehicle in a tunnel is recognized by the recognition unit, the control unit controls the display mode of the display unit when being in a vicinity of an entrance and in a vicinity of an exit of the tunnel (FIGS. 5A and 5B).

With such a configuration, the display mode of the CMS display can be appropriately controlled in the vicinity of the entrance and in the vicinity of the exit of a tunnel in accordance with the change in peripheral illuminance of the vehicle, for example.

The present invention is not limited to the embodiment described above, and various modifications and changes are possible within the scope of the invention.

What is claimed is:

1. A vehicle control apparatus comprising:
  a shooting unit configured to shoot a periphery of a vehicle;
  a display unit configured to display an image shot by the shooting unit;
  an acquisition unit configured to acquire illuminance information regarding peripheral illuminance of the vehicle; and
  a control unit configured to control a display mode of the display unit based on the illuminance information acquired by the acquisition unit, wherein the control unit:
    changes the control of the display mode of the display unit between a case where peripheral illuminance of the vehicle increases and a case where the peripheral illuminance of the vehicle decreases,
    performs control such that the change of the display mode of the display unit differs between a case where the peripheral illuminance of the vehicle increases and a case where the peripheral illuminance of the vehicle decreases, and
    performs control such that the timing at which the display mode of the display unit changes is set earlier when the peripheral illuminance of the vehicle increases than when the peripheral illuminance of the vehicle decreases.

2. The vehicle control apparatus according to claim 1, wherein
  the acquisition unit, when the peripheral illuminance of the vehicle has changed by a predetermined amount, determines the illuminance after the change, and acquires the determined illuminance information, and
  the control unit performs control such that the period of time until the acquisition unit acquires the determined illuminance information is shorter when the peripheral illuminance of the vehicle increases than when the peripheral illuminance of the vehicle decreases.

3. The vehicle control apparatus according to claim 1, wherein the control unit performs control such that the change speed of the display mode of the display unit increases when the peripheral illuminance of the vehicle increases relative to when the peripheral illuminance of the vehicle decreases.

4. The vehicle control apparatus according to claim 1, wherein the display unit displays an image shot by the shooting unit while the shooting unit is performing shooting.

5. The vehicle control apparatus according to claim 1, wherein the shooting unit shoots an image side-rearward of the vehicle.

6. The vehicle control apparatus according to claim 1, wherein the acquisition unit acquires at least one of information regarding forward illuminance of the vehicle and information regarding upper illuminance of the vehicle.

7. The vehicle control apparatus according to claim 1, further comprising a recognition unit configured to recognize a travel scene of the vehicle, wherein when traveling of the vehicle in a tunnel is recognized by the recognition unit, the control unit controls the display mode of the display unit when being in a vicinity of an entrance and in a vicinity of an exit of the tunnel.

8. A control method to be executed in a vehicle control apparatus, the control method comprising:

displaying an image shot by a shooting unit that shoots a periphery of a vehicle;

acquiring illuminance information regarding peripheral illuminance of the vehicle; and controlling a display mode of the display unit based on the acquired illuminance information, wherein the controlling includes:

changing the control of the display mode between a case where peripheral illuminance of the vehicle increases and a case where the peripheral illuminance of the vehicle decreases, performing control such that the change of the display mode of the display unit differs between a case where the peripheral illuminance of the vehicle increases and a case where the peripheral illuminance of the vehicle decreases, and performing control such that the timing at which the display mode of the display unit changes is set earlier when the peripheral illuminance of the vehicle increases than when the peripheral illuminance of the vehicle decreases.

9. A non-transitory computer-readable storage medium storing a program causing a computer to:

display an image shot by a shooting unit that shoots a periphery of the vehicle;

acquire illuminance information regarding peripheral illuminance of the vehicle; and control a display mode of the display unit based on the acquired illuminance information, wherein when the control is performed, the control of the display mode is changed between a case where peripheral illuminance of the vehicle increases and a case where the peripheral illuminance of the vehicle decreases, the change of the display mode of the display unit differs between a case where the peripheral illuminance of the vehicle increases and a case where the peripheral illuminance of the vehicle decreases, and the timing at which the display mode of the display unit changes is set earlier when the peripheral illuminance of the vehicle increases than when the peripheral illuminance of the vehicle decreases.

* * * * *